(12) United States Patent
Chang et al.

(10) Patent No.: US 9,898,305 B2
(45) Date of Patent: Feb. 20, 2018

(54) DISPLAY METHOD FOR LOGO GRAPHICS DISPLAYED ON SCREEN AND SMART DEVICE

(71) Applicant: Insyde Software Corporation, Taipei (TW)

(72) Inventors: Yu Lung Chang, Taipei (TW); Chih-Kao Wang, Taipei (TW); Hermann Young, Taipei (TW)

(73) Assignee: Insyde Software Corporation, Taipei (TW)

( * ) Notice: Subject to any disclaimer, the term of this patent is extended or adjusted under 35 U.S.C. 154(b) by 0 days.

(21) Appl. No.: 15/040,551

(22) Filed: Feb. 10, 2016

(65) Prior Publication Data

US 2016/0241395 A1 Aug. 18, 2016

(30) Foreign Application Priority Data

Feb. 17, 2015 (TW) .............................. 104105561 A

(51) Int. Cl.
| | |
|---|---|
| *G06F 1/00* | (2006.01) |
| *G06F 9/44* | (2018.01) |
| *G06F 3/14* | (2006.01) |
| *H04L 29/06* | (2006.01) |
| *H04L 9/08* | (2006.01) |

(52) U.S. Cl.
CPC .............. *G06F 9/4401* (2013.01); *G06F 3/14* (2013.01); *H04L 9/0894* (2013.01); *H04L 63/04* (2013.01)

(58) Field of Classification Search
CPC ................................. G06F 3/14; H04L 9/0838
See application file for complete search history.

(56) References Cited

U.S. PATENT DOCUMENTS

| | | | | |
|---|---|---|---|---|
| 2014/0068239 A1* | 3/2014 | Yang | ..................... | G06F 9/4401 713/2 |
| 2014/0304520 A1* | 10/2014 | Bobzin | ................. | G06F 21/572 713/187 |
| 2014/0331037 A1* | 11/2014 | Lewis | ................... | G06F 9/4401 713/2 |

OTHER PUBLICATIONS

Hewlett-Packard et al, Advanced Configuration and Power Interface Specification, Dec. 6, 2011, revision 5.0, p. 179 and 180.*

* cited by examiner

*Primary Examiner* — Austin Hicks
(74) *Attorney, Agent, or Firm* — Muncy, Geissler, Olds & Lowe, P.C.

(57) ABSTRACT

A display method for logo graphics displayed on a screen is provided, implemented by a smart device. The display method includes the following steps: powering on the smart device, to enter a Basic Input Output System (BIOS) stage; accessing, from a first non-volatile memory of the smart device, exclusive logo graphics data private-key encrypted for decryption, and using a public key pre-stored in a second non-volatile memory of the smart device for verification; and displaying, when the public key matches a private key corresponding to the exclusive logo graphics data, an exclusive logo graphic on a screen according to the decrypted and decompressed exclusive logo graphics data. The present invention further includes a smart device, a readable record medium, and a computer program product.

12 Claims, 6 Drawing Sheets

DISPLAY METHOD FOR LOGO GRAPHICS DISPLAYED ON SCREEN AND SMART DEVICE

BACKGROUND

Technical Field

The present invention relates to the technical field of smart devices, and in particular, to a display method for logo graphics displayed on a screen, a smart device, a readable record medium, and a computer program product.

Related Art

When power of a smart device, such as a computer, a tablet computer, and a smart phone, is turned on, the smart device executes a Basic Input Output System (BIOS), and an exclusive logo graphic will be displayed on a screen in a Power-on Self Test (POST) stage.

In the POST stage, the exclusive logo graphic is displayed on the screen without verification, and the exclusive logo graphic may be replaced due to malware, a hacker, or the like, resulting in that the exclusive logo graphic cannot be displayed and even an incorrect logo graphic is displayed. Moreover, when the smart device implements warm boot, the smart device has to execute the POST procedure of the BIOS again and display the exclusive logo graphic on the screen again, and therefore, the exclusive logo graphic cannot be displayed quickly.

SUMMARY

In view of the foregoing problems, an objective of the present invention is to provide a display method for logo graphics displayed on a screen, a smart device, a readable record medium, and a computer program product, which verifies a logo graphic to be displayed in a boot stage of a smart device, so as to ensure that the logo graphic to be displayed is an exclusive logo graphic, and provides a function of quickly displaying the logo graphic when warm boot is implemented on the smart device.

According to a first aspect of the present invention, a display method for logo graphics displayed on a screen is provided, implemented by a smart device, the display method including the following steps:

powering on the smart device to enter a BIOS stage;

accessing, from a first non-volatile memory of the smart device, exclusive logo graphics data private-key encrypted for decryption, and using a public key pre-stored in a second non-volatile memory of the smart device for verification, and displaying, when the public key matches a private key corresponding to the exclusive logo graphics data, an exclusive logo graphic on a screen according to the decrypted and decompressed exclusive logo graphics data.

According to a second aspect of the present invention, a display method for logo graphics displayed on a screen is provided, implemented by a smart device, the display method including the following steps:

powering on the smart device to enter a BIOS stage;

accessing, from a first non-volatile memory of the smart device, exclusive logo graphics data private-key encrypted for decryption, and using a public key pre-stored in a second non-volatile memory of the smart device for verification;

storing, when the public key matches a private key corresponding to the exclusive logo graphics data, the decrypted and decompressed exclusive logo graphics data in a cache area of a memory of the smart device;

setting a quick logo flag in the first non-volatile memory;

accessing the decrypted and decompressed exclusive logo graphics data in the cache area of the memory, so as to display an exclusive logo graphic on a screen of the smart device;

implementing warm boot on the smart device to enter the BIOS stage;

determining whether the quick logo flag has been set;

accessing, when the quick logo flag has been set, the decrypted and decompressed exclusive logo graphics data in the cache area of the memory; and displaying the exclusive logo graphic on the screen.

According to a third aspect of the present invention, a smart device is provided, including:

a first non-volatile memory, configured to store a BIOS and exclusive logo graphics data private-key encrypted;

a second non-volatile memory, configured to pre-store a public key;

a memory;

a screen, configured to display an exclusive logo graphic, and a processor, configured to execute the following steps:

accessing, when the smart device is powered on to enter the BIOS stage, from the first non-volatile memory of the smart device, the exclusive logo graphics data private-key encrypted for decryption, and using a public key pre-stored in a second non-volatile memory of the smart device for verification;

storing, when the public key matches a private key corresponding to the exclusive logo graphics data, the decrypted and decompressed exclusive logo graphics data in a cache area of the memory; and accessing the decrypted and decompressed exclusive logo graphics data in the cache area of the memory, so as to display the exclusive logo graphic on the screen.

According to a fourth aspect of the present invention, a readable record medium storing a program therein is provided, where the readable record medium can implement the display method according to the first aspect or the second aspect of the present invention after a smart device is loaded with the program and executes the program.

According to a fifth aspect of the present invention, a computer program product storing a program therein is provided, where the computer program product can implement the display method according to the first aspect or the second aspect of the present invention after a smart device is loaded with the program and executes the program.

DETAILED DESCRIPTION

To make persons of ordinary skill in the art further understand the present invention, composition content of the present invention and effects to be achieved are described in detail hereinafter by listing several preferred embodiments and with reference to the accompanying drawings.

Figure 1:
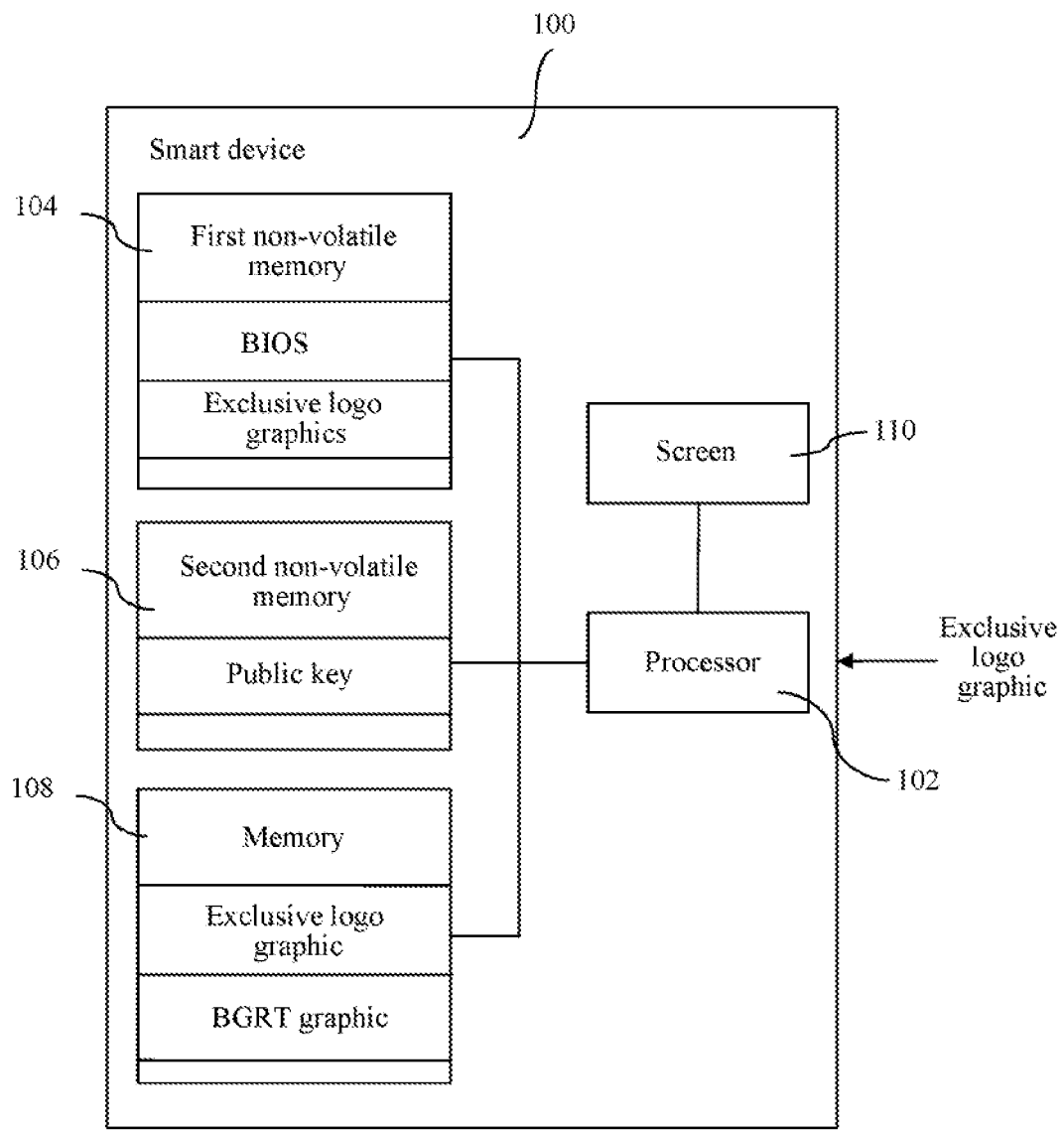
FIG. 1 is a block diagram of a smart device according to a first embodiment of the present invention.

FIG. 1 is a block diagram of a smart device according to a first embodiment of the present invention. In the first embodiment, a smart device 100 includes a processor 102, a first non-volatile memory 104, a second non-volatile memory 106, a memory 108, and a screen 110.

The first non-volatile memory 104 stores a BIOS and data of an exclusive logo graphic. The data of the exclusive logo graphic is data that is compressed and private-key encrypted.

The second non-volatile memory 106 stores a public key, and the public key matches a private key corresponding to the exclusive logo graphic. The second non-volatile memory 106 is different from the first non-volatile memory 104, so as to avoid that malware or a hacker modifies or destroys the public key while replacing the exclusive logo graphic in the first non-volatile memory 104.

A cache area of the memory 108 stores decrypted and decompressed exclusive logo graphics data and graphics data of a Boot Graphics Resource Table (BGRT).

A table part of an Advanced Configuration and Power Interface (ACPI) of a Universal Extensible Firmware Interface (UEFI) BIOS of Windows 8 includes a BGRT, where the BGRT is a mechanism for displaying a LOGO of Windows 8.

When the smart device 100 is powered on to enter a BIOS stage, the processor 102 accesses, from the first non-volatile memory 104, the exclusive logo graphics data that is private-key encrypted and compressed for decryption and decompression, and uses the public key pre-stored in the second non-volatile memory 106 for verification.

When the public key matches the private key corresponding to the exclusive logo graphic, the processor 102 stores the decrypted and decompressed exclusive logo graphics data in the cache area of the memory 108.

The processor 102 accesses the decrypted and decompressed exclusive logo graphics data in the cache area of the memory 108, so as to display the exclusive logo graphic on the screen 110.

The processor 102 creates, in the table of the ACPI, a BGRT corresponding to the graphics data of the BGRT, and stores the graphics data of the BGRT including the decrypted and decompressed exclusive logo graphics data in the cache area of the memory 108.

In an operating system stage, the processor 102 reads the BGRT in the table of the ACPI, so as to access the graphics data of the BGRT in the cache area of the memory 108, and continuously displays the exclusive logo graphic, in addition to the graphics of the BGRT, on the screen 110 in a period of entering the operating system stage from the BIOS stage.

Figure 2:
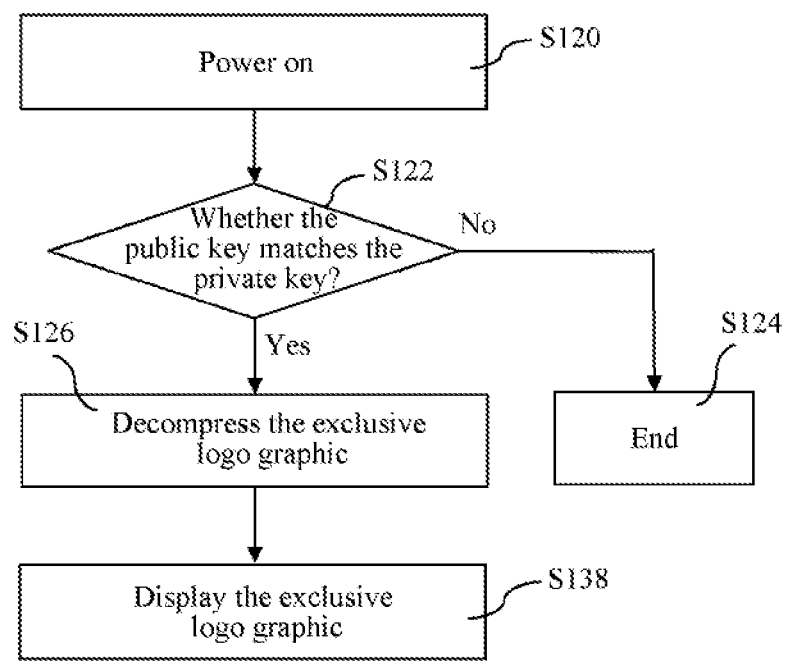
FIG. 2 is a flowchart of a display method for logo graphics displayed on a screen according to the first embodiment of the present invention.

FIG. 2 is a flowchart of a display method for logo graphics displayed on a screen according to the first embodiment of the present invention. Flow steps in FIG. 2 are described with reference to the components in FIG. 1.

In the first embodiment, a BIOS developer inputs, to the smart device 100, the exclusive logo graphics data that is compressed and private-key encrypted. The processor 102 updates, in the BIOS of the first non-volatile memory 104, the received exclusive logo graphics data that is compressed and private-key encrypted.

The smart device 100 is powered on to enter the BIOS stage (step S120). The processor 102 accesses, from the first non-volatile memory 104, the exclusive logo graphics data that is compressed and private-key encrypted for decryption, and uses the public key pre-stored in the second non-volatile memory 106 for verification (step S122).

If the public key does not match the private key corresponding to the exclusive logo graphics data, it indicates that the logo graphic has been changed by malware or a hacker, and this boot procedure is ended (step S124); and if the public key matches the private key corresponding to the exclusive logo graphics data, the processor 102 decompresses the compressed and decrypted exclusive logo graphics data (step S126), and displays the exclusive logo graphic on the screen 110 according to the decrypted and decompressed exclusive logo graphics data (step S138).

Figure 3:
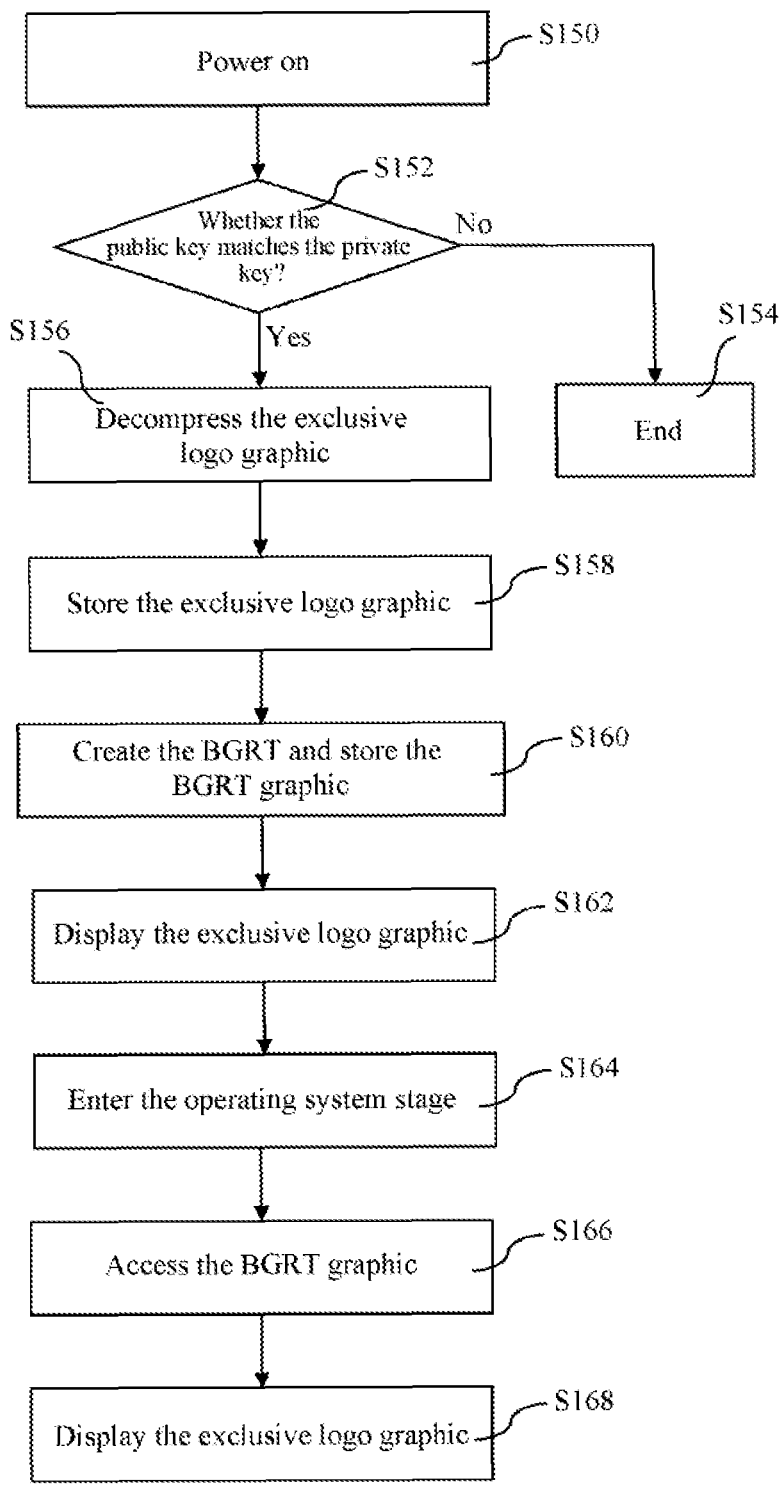
FIG. 3 is a flowchart of a display method for logo graphics displayed on a screen according to a second embodiment of the present invention.

FIG. 3 is a flowchart of a display method for logo graphics displayed on a screen according to a second embodiment of the present invention. Flow steps in FIG. 3 are described with reference to the components in FIG. 1.

The method steps implemented in steps S150, S152, S154, and S156 of the second embodiment are the same as the method steps implemented in steps S120, S122, S124, and S126 of the first embodiment, and therefore, descriptions of the steps are omitted.

Then, the processor 102 stores the decompressed and decrypted exclusive logo graphics data in the cache area of the memory 108 (step S158). The processor 102 creates, in the table of the ACPI, a BGRT corresponding to the graphics data of the BGRT, and stores the graphics data of the BGRT including the decompressed and decrypted exclusive logo graphics data in the cache area of the memory 108 (step S160).

The processor 102 accesses the decompressed and decrypted exclusive logo graphics data in the cache area of the memory 108, so as to display an exclusive logo graphic on the screen 110 (step S162).

The smart device 100 enters the operating system stage from the BIOS stage (step S164). The processor 102 reads the BGRT in the table of the ACPI to access the graphics data of the BGRT including the decompressed and decrypted exclusive logo graphics data in the cache area of the memory 108 (step S166), so that the screen 110 continuously displays the exclusive logo graphic, in addition to the graphics of the BGRT, in a period of entering the operating system stage from the BIOS stage (step S168).

Figure 4:
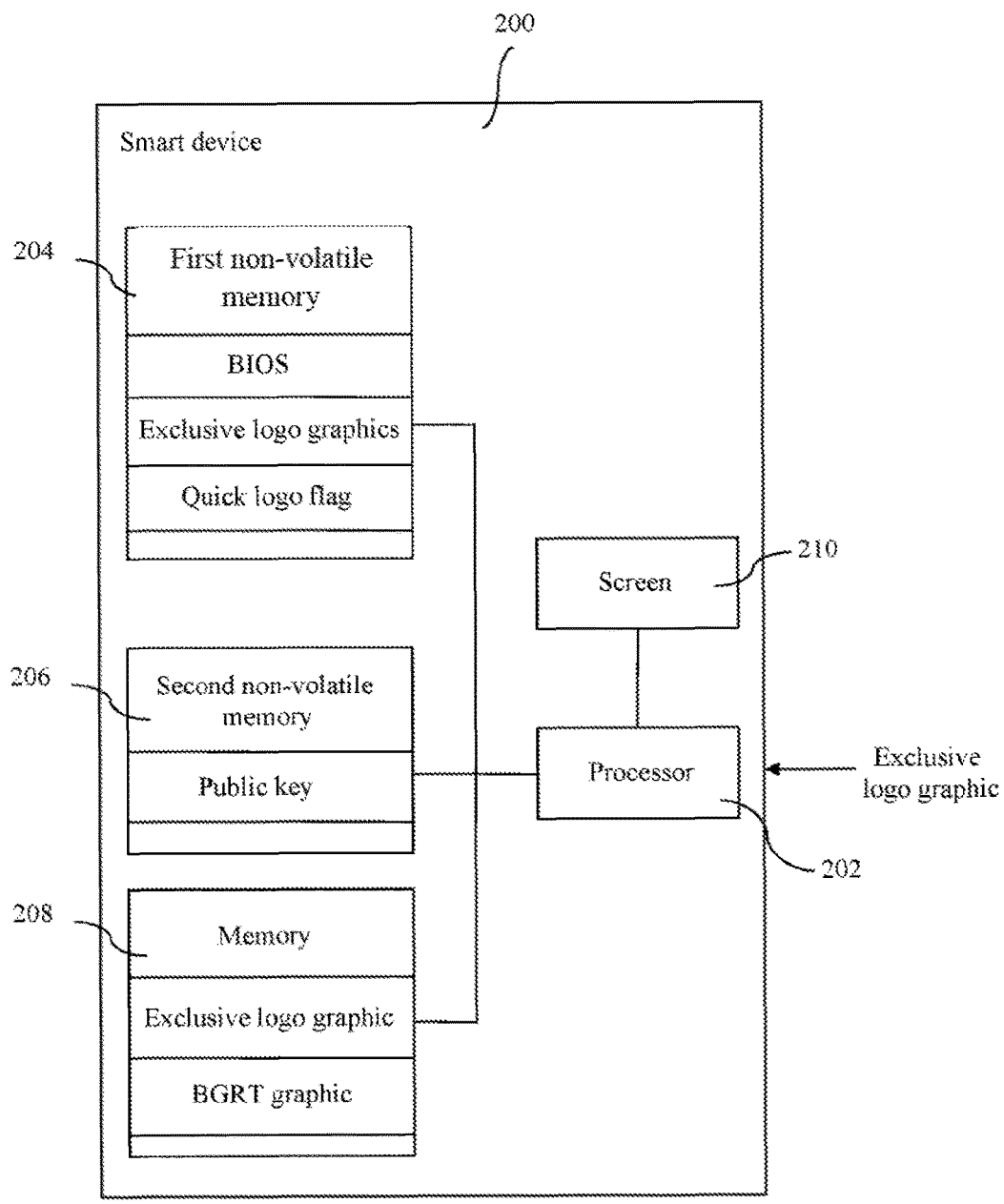
FIG. 4 is a block diagram of a smart device according to a third embodiment of the present invention.

FIG. 4 is a block diagram of a smart device according to a third embodiment of the present invention. In the third embodiment, a smart device 200 includes a processor 202, a first non-volatile memory 204, a second non-volatile memory 206, a memory 208, and a screen 210.

The first non-volatile memory 204 stores a BIOS, exclusive logo graphics data, and a quick logo flag. The exclusive logo graphics data is data that is compressed and private-key encrypted.

When the smart device 200 is powered on, the processor 202 clears a value of a quick logo flag in the first non-volatile memory 204; and after the processor 202 stores the decompressed and decrypted exclusive logo graphics data in a cache area of the memory 208, the processor 202 sets the value of the quick logo flag in the first non-volatile memory 204.

In addition to the foregoing descriptions of functions, other functions of the processor 202, the first non-volatile memory 204, the second non-volatile memory 206, the memory 208, and the screen 210 of the third embodiment are the same as the functions of the processor 102, the first non-volatile memory 104, the second non-volatile memory 106, the cache area of the memory 108, and the screen 110 of the first embodiment, and descriptions thereof are omitted herein.

Figure 5:
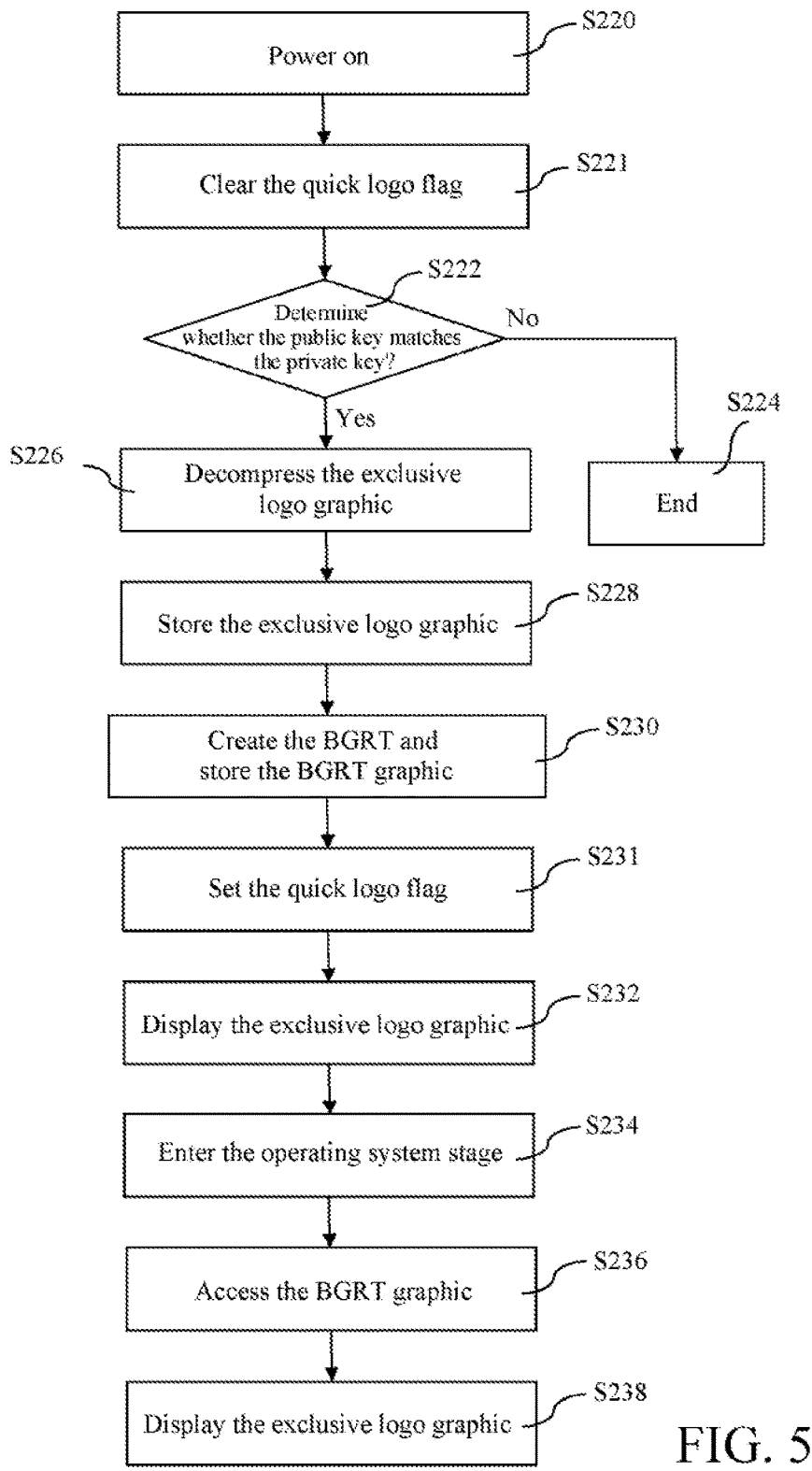
FIG. 5 is a flowchart of a display method for logo graphics displayed on a screen according to the third embodiment of the present invention.

FIG. 5 is a flowchart of a display method for logo graphics displayed on a screen according to the third embodiment of the present invention. Flow steps in FIG. 5 are described with reference to the components in FIG. 4.

In the third embodiment, a BIOS developer inputs, to the smart device 200, the exclusive logo graphics data that is compressed and private-key encrypted. The processor 202 updates, in the BIOS of the first non-volatile memory 204, the received exclusive logo graphics data that is private-key encrypted.

The smart device 200 is powered on to enter the BIOS stage (step S220). The processor 202 clears a value of a quick logo flag in the first non-volatile memory 204 (step S221).

The method steps implemented in steps S222, S224, S226, S228, and S230 of the third embodiment are the same as the method steps implemented in steps S122, S124, and S126 of the first embodiment and steps S158 and S160 of the second embodiment, and descriptions of the steps are omitted herein.

After step S230, the processor 202 sets the value of the quick logo flag in the first non-volatile memory 204 (step S231).

The method steps implemented in steps S232, S234, S236, and S238 of the third embodiment are the same as the method steps implemented in steps S162, S164, S166, and S168 of the second embodiment, and therefore, descriptions of the steps are omitted herein.

Figure 6:
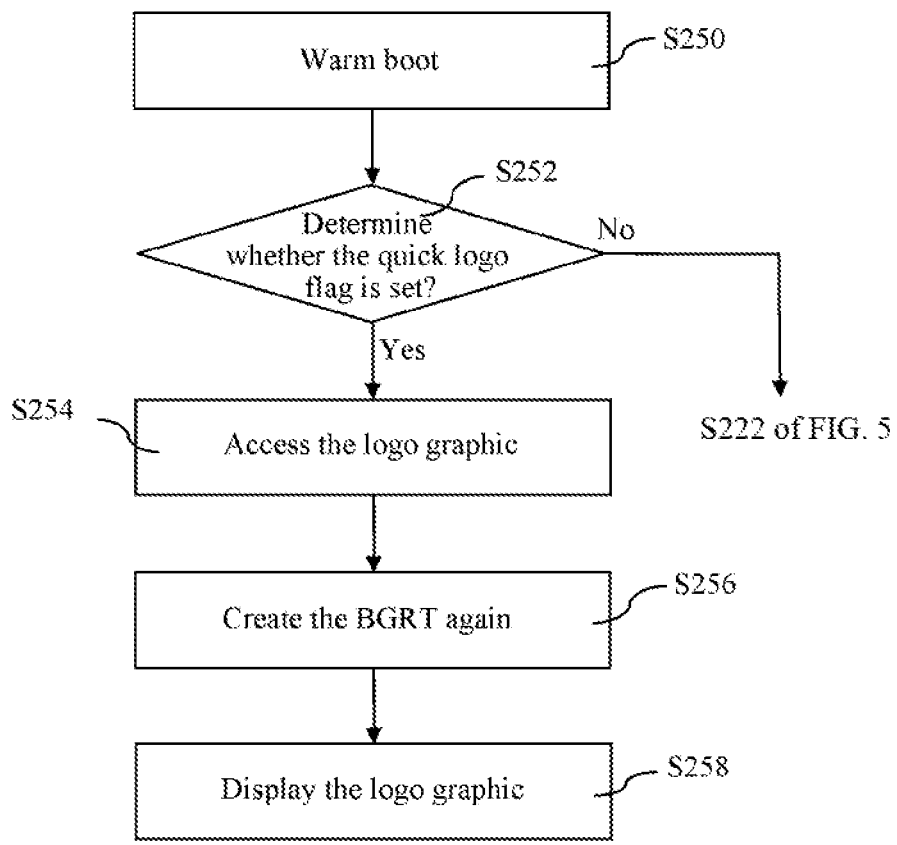
FIG. 6 is a flowchart of a display method for logo graphics displayed on a screen during warm boot of the smart device according to the third embodiment of the present invention.

FIG. 6 is a flowchart of a display method for logo graphics displayed on a screen during warm boot of a smart device according to the third embodiment of the present invention. Flow steps in FIG. 6 are described with reference to the components in FIG. 4.

Warm boot is implemented on the smart device 200 to enable the smart device 200 to enter the BIOS stage (step S250). The processor 202 determines whether the value of the quick logo flag in the first non-volatile memory 204 has been set (step S252), and if the value of the quick logo flag has not been set, step S222 of FIG. 5 is implemented; and if the value of the quick logo flag has been set, the processor 202 accesses the decompressed and decrypted exclusive logo graphics data in the cache area of the memory 208 (step S254).

The processor 202 creates, in the table of the ACPI, a BGRT corresponding to the graphics data of the BGRT in the cache area of the memory 208 again (step S256). The processor 202 accesses the decompressed and decrypted exclusive logo graphics data in the cache area of the memory 208, so as to display an exclusive logo graphic on the screen 210 (step S258).

The smart device 200 enters the operating system stage from the BIOS stage again. The processor 202 reads the BGRT in the table of the ACPI to access the graphics data of the BGRT including the decompressed and decrypted exclusive logo graphics data in the cache area of the memory 208, so that the screen 210, continuously displays the exclusive logo graphic, in addition to the graphics of the BGRT, in a period of entering the operating system stage from the BIOS stage.

The method of the present invention may be drafted and implemented in the form of a program, and the program can be stored in a readable record medium. After a smart device loads the program into the record medium and executes the program, the method steps shown in the foregoing descriptions and drawings can be implemented.

The foregoing method of the present invention may be implemented by a computer program product storing a program therein, and after the smart device, for example, downloads the program from a network and executes the program, the method steps shown in the foregoing descriptions and drawings can be implemented.

The present invention provides a display method for logo graphics displayed on a screen, a smart device, a readable record medium, and a computer program product. Advantages thereof are as follows: a logo graphic to be displayed is verified in a boot stage of a smart device, so as to ensure that the logo graphic to be displayed is an exclusive logo graphic and avoid that malware or a hacker replaces the exclusive graphic, and a function capable of quickly displaying the logo graphic is provided when warm boot is implemented on the smart device.

Although the present invention has been described as above with reference to preferred embodiments and exemplary accompanying drawings, the present invention is not limited thereto. Any modification, omission, and change made to the aspects and contents of embodiments by persons skilled in the prior art shall not depart from the scope of the claims of the present invention.

What is claimed is:

1. A display method for logo graphics displayed on a screen, implemented by a smart device having a first non-volatile memory, a second non-volatile memory, a third memory and a screen, the display method comprising the following steps:
pre-storing private-key encrypted exclusive logo graphics data in the first non-volatile memory and a public key in the second non-volatile memory;
powering on the smart device, to enter a Basic Input Output System (BIOS) stage;
comparing a private key of the private-key encrypted exclusive logo graphics data pre-sorted in the first non-volatile memory and the public key pre-stored in the second non-volatile memory; and
when the public key matches the private key of the private-key encrypted exclusive logo graphics data, decrypting and decompressing the private-key encrypted exclusive logo graphics data and storing the decrypted and decompressed exclusive logo graphics data in the third memory; and
displaying the exclusive logo graphic obtained from the decrypted and decompressed exclusive logo graphics data on the screen.

2. The display method according to claim 1, wherein before the step of storing the private-key encrypted exclusive logo graphics data in the first non-volatile memory, the method comprises a step of compressing the exclusive logo graphics data; and
before the step of displaying the exclusive logo graphic on the screen, the method comprises a step of decompressing the compressed exclusive logo graphics data.

3. The display method according to claim 1, wherein, after the step of displaying the exclusive logo graphic on the screen, the method comprises the following steps:
creating, in a table of an Advanced Configuration and Power Interface (ACPI), a Boot Graphics Resource Table (BGRT) corresponding to graphics data of the BGRT, and storing the graphics data of the BGRT comprising the decrypted and decompressed exclusive logo graphics data in a third memory.

4. The display method according to claim 3, further comprising the following step:
in an operating system stage, reading the BGRT in the table of the ACPI to access the graphics data of the BGRT in the third memory.

5. A display method for logo graphics displayed on a screen, implemented by a smart device having a first non-volatile memory, a second non-volatile memory and a third memory, the display method comprising the following steps:

pre-storing private-key encrypted exclusive logo graphics data in the first non-volatile memory and a public key in the second non-volatile memory;

powering on the smart device, to enter a Basic Input Output System (BIOS) stage;

comparing a private key of the private-key encrypted exclusive logo graphics data pre-stored in the first non-volatile memory and the public key pre-stored in the second non-volatile memory;

when the public key matches the private key of the private-key encrypted exclusive logo graphics data, decrypting and decompressing the exclusive logo graphics data and storing the decrypted and decompressed exclusive logo graphics data in the third memory;

setting a quick logo flag in the first non-volatile memory;

accessing the decrypted and decompressed exclusive logo graphics data in the third memory;

implementing warm boot on the smart device, to enter the BIOS stage;

determining whether the quick logo flag has been set;

accessing, when the quick logo flag has been set, the decrypted and decompressed exclusive logo graphics data in the third memory; and displaying the exclusive logo graphic obtained from the decrypted and decompressed exclusive logo graphics data on the screen.

6. The display method according to claim 5, wherein before the step of storing the private-key encrypted exclusive logo graphics data in the first non-volatile memory, the method comprises a step of compressing the exclusive logo graphics data; and before the step of storing the decrypted and decompressed exclusive logo graphics data in the third memory, the method comprises a step of decompressing the compressed exclusive logo graphics data.

7. The display method according to claim 5, wherein, after the step of storing the decrypted and decompressed exclusive logo graphics data in the third memory, the method comprises the following steps:

creating, in a table of an Advanced Configuration and Power Interface (ACPI), a Boot Graphics Resource Table (BGRT) corresponding to graphics data of the BGRT, and storing the graphics data of the BGRT comprising the decrypted and decompressed exclusive logo graphics data in the third memory.

8. The display method according to claim 7, further comprising the following step:

in an operating system stage, reading the BGRT in the table of the ACPI to access the graphics data of the BGRT in the third memory.

9. A smart device, comprising:

a first non-volatile memory, configured to pre-store a Basic Input Output System (BIOS) and private-key encrypted exclusive logo graphics data;

a second non-volatile memory, configured to pre-store a public key;

a third memory, configured to store decrypted and decompressed exclusive logo graphics data;

a screen, configured to display an exclusive logo graphic; and a processor, configured to execute the following steps:

when the smart device is powered on to enter the BIOS stage, comparing a private key of the private-key encrypted exclusive logo graphics data pre-stored in the first non-volatile memory and the public key pre-stored in the second non-volatile memory;

when the public key matches the private key of the private-key encrypted exclusive logo graphics data, decrypting and decompressing the private-key encrypted exclusive logo graphics data and storing the decrypted and decompressed exclusive logo graphics data in the third memory; and displayed the exclusive graphics obtained from the decrypted and decompressed exclusive logo graphics data on the screen.

10. The smart device according to claim 9, wherein, after the storing the decrypted and decompressed exclusive logo graphics data in the third memory, the processor executes the following steps:

creating, in a table of an Advanced Configuration and Power Interface (ACPI), a Boot Graphics Resource Table (BGRT) corresponding to graphics data of the BGRT, and storing the graphics data of the BGRT comprising the decrypted and decompressed exclusive logo graphics data in the third memory; and reading, in an operating system stage, the BGRT in the table of the ACPI to access the graphics data of the BGRT in the third memory, and continuously displaying the exclusive logo graphic on the screen in a period of entering the operating system stage from the BIOS stage.

11. The smart device according to claim 9, wherein the first non-volatile memory further stores a quick logo flag, and the processor sets the quick logo flag in the first non-volatile memory when the public key matches the private key of the private-key encrypted exclusive logo graphics data.

12. The smart device according to claim 11, wherein the processor further executes the following steps:

determining, when warm boot is implemented on the smart device to enter the BIOS stage, whether the quick logo flag has been set;

accessing, when the quick logo flag has been set, the decrypted and decompressed exclusive logo graphics data in the third memory; and displaying the exclusive logo graphic on the screen.

* * * * *